J. B. KITTS, Sr.
SEAL PLUG.
APPLICATION FILED JUNE 13, 1911.
1,030,309.
Patented June 25, 1912.
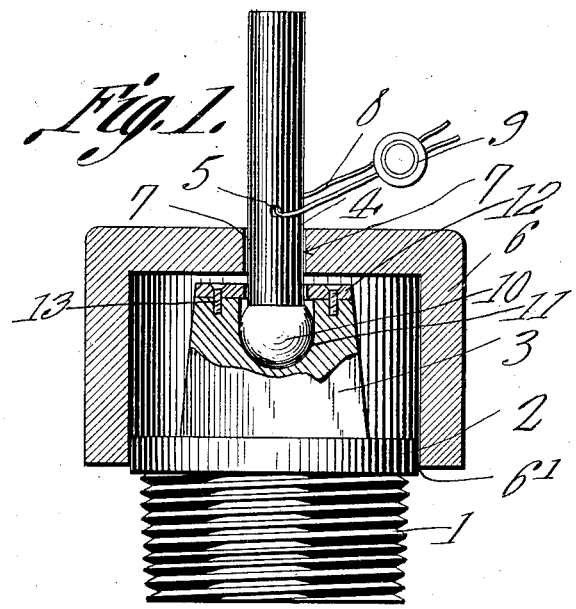
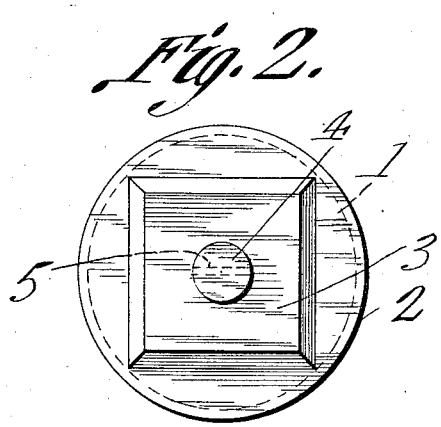
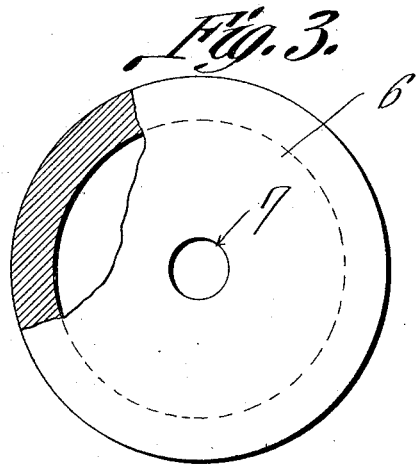
Witnesses
Jacob B. Kitts, Sr.,
Inventor
by
Attorneys

UNITED STATES PATENT OFFICE.

JACOB B. KITTS, SR., OF DARBY, PENNSYLVANIA.

SEAL-PLUG.

1,030,309.  Specification of Letters Patent.  Patented June 25, 1912.

Application filed June 13, 1911. Serial No. 632,976.

*To all whom it may concern:*

Be it known that I, JACOB B. KITTS, Sr., a citizen of the United States, residing at Darby, in the county of Delaware and State of Pennsylvania, have invented a new and useful Seal-Plug, of which the following is a specification.

This invention relates to improvements in seal plugs, and the primary object of the invention is the provision of a cylindrical cap adapted to surround the shouldered portion of a plug, said shouldered portion being further provided with a cylindrical stem projecting concentrically therefrom and through an opening of larger diameter than the stem in a cover, the said cover being mounted so as to protect the shouldered portion and be rotatably mounted so it will be impossible for a wrench to have access to the shouldered portion of the plug, whereby the plug may not be removed, and a connection made to the supply portion of the gas system.

A further object of the invention is the provision of a seal plug adapted to be placed in the end of all surface pipes where the ordinary T is placed from the side outlet of which the connection is made to a meter, and in the free end of the T the plug is screwed. In all gas supply systems, at the bottom of the riser, a T is also placed, into the side outlet of which connection is made to the meter.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings:—Figure 1 is a side elevation of the plug adapted to be used in connection with this invention, with the sealing cover and lock in operable position thereon, a portion of the shouldered portion being in section to show the connection of the stem thereto. Fig. 2 is a top plan view of the plug. Fig. 3 is a top plan view of the protecting casing, with a portion broken away, shown in section, to clearly indicate the construction thereof.

Referring to the drawings, the numeral 1 indicates the exteriorly threaded portion of the plug, which is provided with a cylindrical annular portion or rim 2 and with a tapered rectangular projection or nut 3, having projecting concentrically therefrom the cylindrical stem or rod 4 provided with the transverse or diametrically disposed bore 5, the purpose of which will presently appear.

In using this plug, the same is screwed into the outlet of the service T and also the inlet of the house T, both the outlet and inlet being the remaining connection of a coupling, after the meter has been connected in position. When the said plug has been screwed home and in place therein, the cover or seal 6 provided with the concentrically disposed aperture 7 fits thereover. The diameter of the bore of the protecting casing or seal is of a slightly larger diameter than the cylindrical portion 2 of the plug, as is clearly indicated at 6', and when the said seal or cover is in the position as shown in Fig. 1 of the drawings, the aperture or transverse bore 5 is directly above and slightly exterior of the said cover or seal so that the wire 8, and its lead seal 9 may be connected to the stem as indicated, and thereby provide a means against the withdrawal of the cover 6 from off of the stem 4 of the sealing plug.

It will thus be seen that the shoulder portion 3 of the plug is sealed and that it is impossible without breaking the wire seal 8 to have access to the shouldered portion 3 of the plug, thereby preventing any tampering with the plug, and its removal from the connection. The opening 7 of the sealing casing is also of a larger diameter than the stem and although the casing or sealing compartment 6 may be rotated upon the stem and the cylindrical portion 2 of the plug, the same cannot be moved sufficiently in a transverse direction to permit of access to the shouldered portion 3 of said plug, thereby protecting said plug so that no wrench can remove the same from the outlet.

In order to prevent the unscrewing of the plug by gripping the stem with a plier or wrench, the stem is provided with the ball 10 which with the recess 11 and retaining plate 12, with the screws 13 provides a ball and socket or flexible joint between the stem and seal plug, thus providing a means whereby the rotation of the stem 4 cannot unscrew the plug 1.

What is claimed is:

1. A seal plug, comprising a body having a wrench engaging shouldered portion, and a threaded end, a casing fitting over said shouldered portion and provided with a central aperture and a stem having its lower end rotatably mounted in said shouldered portion extending exterior of the casing, said extended end forming a seal attaching stem.

2. A seal plug, comprising a body having a wrench engaging shouldered portion, and a threaded end, a casing fitting over said shouldered portion and provided with a central aperture, said shouldered portion being provided with a centrally disposed socket, and a stem having a globular lower end fitted within the socket of the shouldered portion, the body of the stem extending through the central aperture of the casing and forming a seal attaching portion.

3. A seal plug, comprising a body having a wrench engaging shouldered portion provided with a globular socket centrally thereof, the other end thereof being threaded, a cylindrical stem provided with a globular end rotatably mounted in the socket of the shouldered portion, a plate mounted upon the said shouldered portion and about the stem to lock the globular end of the stem within the socket, and a casing fitting over said shouldered portion and provided with a central aperture through which said stem passes, said extended end of the stem forming a seal attaching portion.

4. A seal plug, comprising a body having a wrench engaging shouldered portion, and a threaded end, a casing fitting over said shouldered portion and provided with a central aperture, a stem provided with a seal attaching portion, said stem being adapted to project through the central aperture of the casing, and coacting means carried by the shouldered portion and the lower end of the stem for rotatably mounting the stem within the shouldered portion.

5. A seal plug having a body provided with a wrench engaging shouldered portion, and a threaded end, a casing fitting over said shouldered portion and provided with a concentric aperture therethrough, a cylindrical stem provided with a seal attaching portion and with a ball upon its lower end, said body portion being provided with a globular socket to receive the ball of the stem, said stem being disposed to pass through the concentric aperture of the casing, as the seal attaching portion thereof projects without the casing, a plate having a concentric aperture fitted upon the outer face of the body and fitting about the stem above the ball upon the end thereof, and means for securing the plate to the shouldered portion of the body to permit the rotation of the stem and to retain the ball within the socket.

In testimony that I claim the foregoing as my own, I have hereto affixed my signature in the presence of two witnesses.

JACOB B. KITTS, Sr.

Witnesses:
  JOHN J. BOYLE,
  TONY DELVECHIO.

---

Copies of this patent may be obtained for five cents each, by addressing the "Commissioner of Patents, Washington, D. C."